US012741650B2

(12) United States Patent
Tsuruga

(10) Patent No.: US 12,741,650 B2
(45) Date of Patent: Sep. 22, 2026

(54) VEHICLE CONTROL DEVICE, VEHICLE CONTROL METHOD, NON-TRANSITORY STORAGE MEDIUM

(71) Applicant: TOYOTA JIDOSHA KABUSHIKI KAISHA, Toyota (JP)

(72) Inventor: Masahiro Tsuruga, Tajimi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/904,219

(22) Filed: Oct. 2, 2024

(65) Prior Publication Data

US 2025/0145161 A1 May 8, 2025

(30) Foreign Application Priority Data

Nov. 7, 2023 (JP) ................................ 2023-190156

(51) Int. Cl.

*B60W 30/192* (2012.01)
*B60R 16/03* (2006.01)
*G06F 8/65* (2018.01)

(52) U.S. Cl.

CPC ........... *B60W 30/192* (2013.01); *B60R 16/03* (2013.01); *G06F 8/65* (2013.01); *B60W 2540/06* (2013.01)

(58) Field of Classification Search

CPC ......... B60R 16/03; B60W 30/192; G06F 8/65
See application file for complete search history.

(56) References Cited

U.S. PATENT DOCUMENTS

2022/0334821 A1* 10/2022 Sakai ........................ G06F 8/65
2023/0297361 A1* 9/2023 Buecherl ............. G06F 11/1433 717/168
2024/0311130 A1* 9/2024 Miyazawa ............ B60W 50/14

FOREIGN PATENT DOCUMENTS

JP 2010243339 A 10/2010
JP 2014221608 A 11/2014
JP 2018086894 A 6/2018

* cited by examiner

*Primary Examiner* — Kevin A Lathers
(74) *Attorney, Agent, or Firm* — Dickinson Wright, PLLC

(57) ABSTRACT

A vehicle control device that is configured to control a vehicle power source, the vehicle control device includes a processor configured to: acquire input information of an operating switch configured to transition on and off states of the vehicle power source; accept a forbidding request from one or more electronic control units installed in the vehicle, the forbidding request being a request to forbid the vehicle power source from being turned to an on state; control the on and off states of the vehicle power source; and when the forbidding request is made in an off state of the vehicle power source, forbid the vehicle power source from being turned to the on state in response to an operation input to the operating switch.

7 Claims, 3 Drawing Sheets

VEHICLE CONTROL DEVICE, VEHICLE CONTROL METHOD, NON-TRANSITORY STORAGE MEDIUM

CROSS-REFERENCE TO RELATED APPLICATION

This application claims priority to Japanese Patent Application No. 2023-190156 filed on Nov. 7, 2023, incorporated herein by reference in its entirety.

BACKGROUND

1. Technical Field

The present disclosure relates to a vehicle control device, a vehicle control method, a non-transitory storage medium that control a power source for a vehicle.

2. Description of Related Art

Japanese Unexamined Patent Application Publication No. 2010-243339 (JP 2010-243339 A) discloses a device for managing software updates for an electronic control unit that controls operations of equipment installed in a vehicle. This device is described as performing updating of software of the electronic control unit when the vehicle is parked (a safe location for the vehicle).

SUMMARY

When a user or the like performs an operation to turn on a power source to start a system of the vehicle (such as by pressing a push start switch or the like) while software of the electronic control unit is being updated when the vehicle is parked, system starting processing will be initiated in a state in which the vehicle is not fully prepared. In this case, there is concern of being affected thereby, such as software update processing that has been carried out up to that point being wasted, the time taken to complete the software update being longer than usual, and so forth.

The present disclosure provides a vehicle control device that can suppress vehicle power source from being turned on during software update processing of an electronic control unit.

In a first aspect of the technology according to the present disclosure, a vehicle control device that is configured to control a vehicle power source includes a processor configured to acquire input information of an operating switch configured to transition on and off states of the vehicle power source, accept a forbidding request from one or more electronic control units installed in the vehicle, to forbid the vehicle power source from being turned to an on state, control the on and off states of the vehicle power source, and when the forbidding request is made in an off state of the vehicle power source, forbid transition of the vehicle power source to the on state by input of the operating switch.

In a second aspect of the technology according to the present disclosure, a vehicle control method for controlling a vehicle power source includes acquiring input information of an operating switch configured to transition on and off states of the vehicle power source, accepting a forbidding request from one or more electronic control units installed in a vehicle, to forbid the vehicle power source from being turned to an on state, and when the forbidding request is made in an off state of the vehicle power source, forbidding transition of the vehicle power source to the on state by input of the operating switch.

In a third aspect of the technology according to the present disclosure, a non-transitory storage medium stores instructions that are executable by one or more processors and that cause the one or more processors to perform functions including acquiring input information of an operating switch configured to transition on and off states of the vehicle power source, accepting a forbidding request from one or more electronic control units installed in a vehicle, to forbid the vehicle power source from being turned to an on state, and when the forbidding request is made in an off state of the vehicle power source, forbidding transition of the vehicle power source to the on state by input of the operating switch.

According to the vehicle control device of the present disclosure above, when there is a forbidding request from the electronic control unit while the vehicle power source is in the off state, transitioning of the vehicle power source to the on state is forbidden even though there is input from the operating switch. According to this processing, when the electronic control unit that has output the forbidding request undergoing software update processing, the vehicle power source can be suppressed from being turned on while updating.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle control device according to the present disclosure forbids transition of a vehicle power source to an on state, in a situation in which input to turn the vehicle power source to an on state is accepted via an operating switch, but starting of the system is not desired. This enables suppressing the vehicle system from starting during software updating processing of the electronic control unit. An embodiment of the present disclosure will be described in detail below with reference to the drawings.

Embodiment

Configuration

Figure 1:
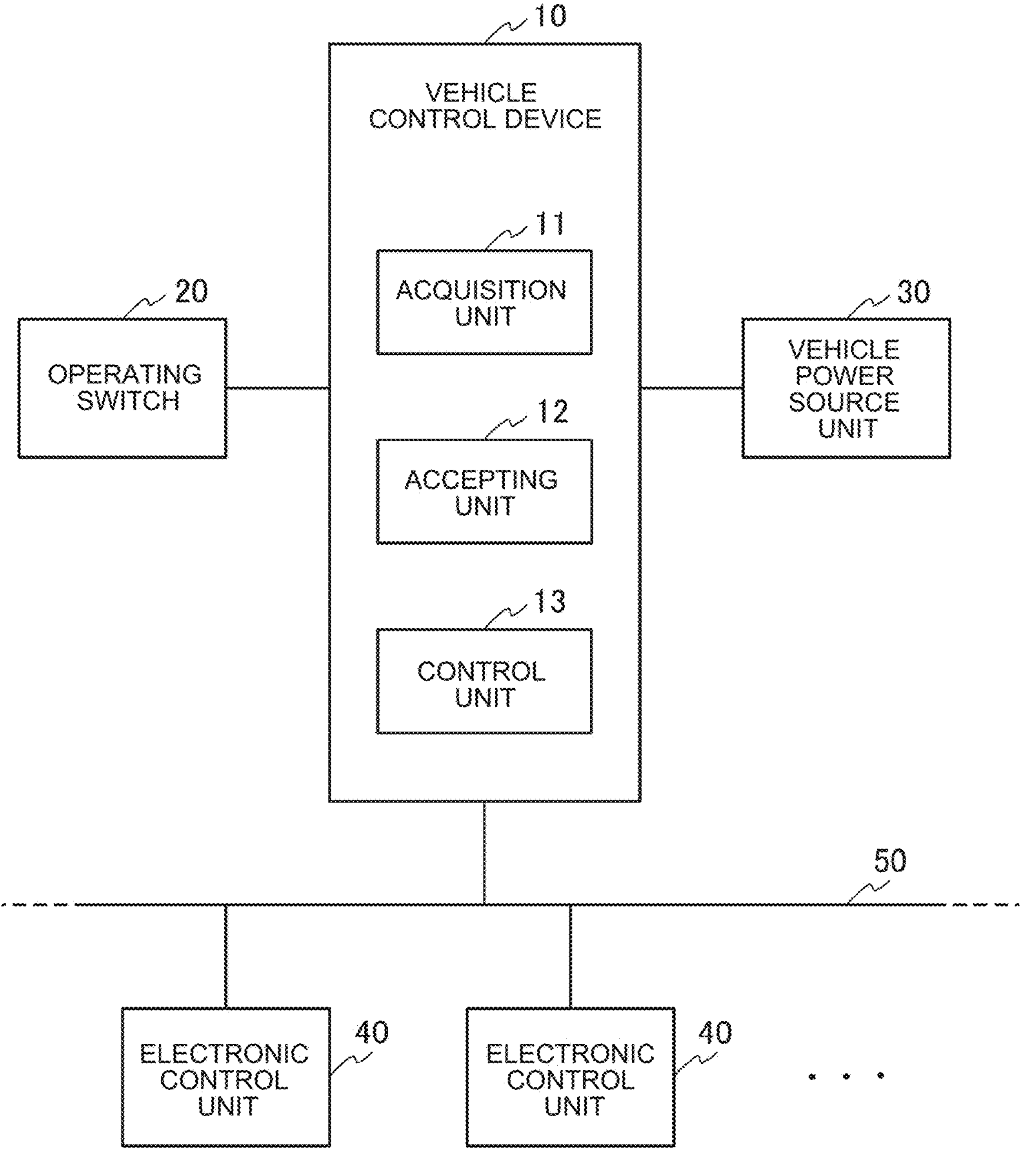
FIG. 1 is a functional block diagram of a vehicle control device and peripheral components thereof according to an embodiment of the present disclosure.

FIG. 1 is a functional block diagram of a vehicle control device 10 and peripheral components thereof according to an embodiment of the present disclosure. Functional blocks exemplified in FIG. 1 include the vehicle control device 10, an operating switch 20, a vehicle power source unit 30, and a plurality of electronic control units (ECU) 40.

The operating switch 20 is a component for accepting operations input to a vehicle by a user such as a driver or the like of the vehicle. An example of this operating switch 20 is a device such as a push start switch button or the like for transitioning between on and off states of the vehicle power source, to start or stop the vehicle system.

The vehicle power source unit 30 is configured to perform operations related to controlling the on/off state of the vehicle power source, based on control (instructions) from the vehicle control device 10. Examples of the vehicle power source unit 30 include equipment and devices such as an electronic control unit (such as a hybrid vehicle (HV)-ECU or the like) relays (IG-P relay, IG-R relay, ACC relay, +BA relay, etc.), and so forth.

The electronic control units 40 are various types of devices installed in the vehicle. Each electronic control unit 40 is made up including a processor, memory, an input/output interface, and so forth, and realizes predetermined functions by the processor reading and executing software (program) stored in the memory. One or more of the electronic control units 40 are electronic control units of which the software can be updated. Necessity of updating the software is confirmed by an in-vehicle device (omitted from illustration) that performs centralized management of updates instructing the electronic control unit that is an object of updating as to whether an update is required.

In the series of processing involved in this software updating, processing that affects behavior of the vehicle is carried out when the vehicle power source is in an off state (IG-OFF) and the system of the vehicle is stopped, such as when the vehicle is parked, from a perspective of vehicle safety. In the present embodiment, an electronic control unit that is the object of updating (a particular electronic control unit 40) outputs a “forbidding request” to the vehicle control device 10, to forbid the vehicle power source from transitioning from the off state (IG-OFF) to the on state (IG-ON), so that the software update that is being performed when the vehicle power source is in the off state (IG-OFF) is not interrupted. Note that the electronic control units 40 and the vehicle control device 10 are communicatively connected to each other via an in-vehicle network 50 such as a Controller Area Network (CAN).

The vehicle control device 10 is configured to control the vehicle power source. This vehicle control device 10 is typically configured as an electronic control unit (such as an extended body ECU) that includes a processor, memory, an input/output interface, and so forth, and the processor reads and executes software (programs) stored in the memory, thereby enabling realizing of functions performed by an acquisition unit 11, an accepting unit 12, and a control unit 13, which are described below.

The acquisition unit 11 acquires input information regarding the operating switch 20 for transitioning the on/off state of the vehicle power source. Examples of the input information include an electrical signal or the like, indicating that a button of the operating switch 20 has been pressed or touched. The acquisition unit 11 detects this electrical signal and thereby determines that an input operation has been performed with respect to the operating switch 20.

The accepting unit 12 accepts a forbidding request to forbid the vehicle power source from being turned to the on state (IG-ON), from one or more electronic control units 40 that are objects of software updating, among the electronic control units 40. This forbidding request may be accepted from all electronic control units 40 that are objects of software updating, or may be accepted just from the electronic control unit 40 that is the last in order of performing the update processing.

The control unit 13 performs various control related to the on/off state of the vehicle power source. One feature control that is executed by the control unit 13 according to the present embodiment is control that, when the power source of the vehicle is in the off state (IG-OFF), such as when parked and the accepting unit 12 has received a forbidding request from one or more electronic control units 40, forbids transition of the power source of the vehicle from the current off state (IG-OFF) to the on state (IG-ON) even when the acquisition unit 11 acquires (detects) a new input from the operating switch 20. Also, another feature control executed by the control unit 13 according to the present embodiment is to lift the forbiddance to transition the vehicle power source to the on state (IG-ON) (to permit the vehicle power source to transition to the on state), since an electronic control unit 40 that continues to issue a forbidding request for a period longer than necessary is suspected of exhibiting an abnormality such as a malfunction. Such control and so forth that is executed by the control unit 13 will be described below in detail.

Control

Next, the control carried out by the vehicle control device 10 according to the embodiment of the present disclosure will be described with further reference to FIGS. 2 to 4.

Figure 2:
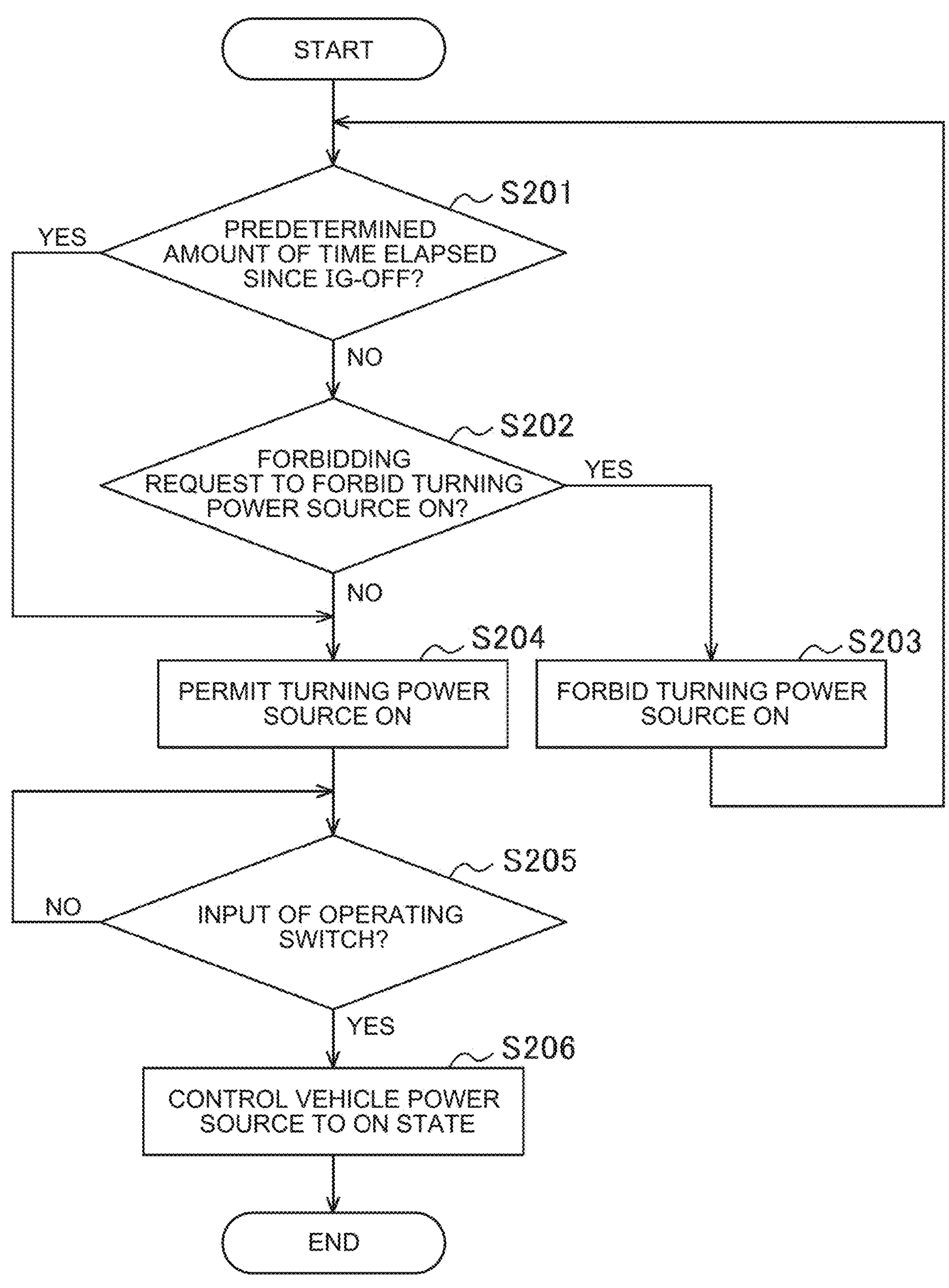
FIG. 2 is a processing flowchart of power source control executed by the vehicle control device.

FIG. 2 is a flowchart showing a processing procedures for power source control executed by the vehicle control device 10 according to the present embodiment. Power source control processing that is exemplified in FIG. 2 is initiated when the power source of the vehicle is turned to the off state (IG-OFF).

(Step S201) The control unit 13 of the vehicle control device 10 determines whether a predetermined amount of time has elapsed since the vehicle power source was turned to the off state (IG-OFF). This determination is made in order to determine whether the software update processing carried out at the electronic control unit 40 after the vehicle power source was turned to the off state (IG-OFF) has been completed. Accordingly, this predetermined amount of time is set to an optional amount of time that is longer than the time required until all software updating processing of the electronic control unit 40 is completed after the vehicle power source is turned to the off state (IG-OFF). Whether the vehicle power source has been turned to the off state (IG-OFF) is determined based on input information from the operating switch 20 acquired by the acquisition unit 11, and so forth.

Now, the time required to complete the software update processing means, for example, when the software download has ended when the vehicle power source is in the on state (IG-ON), the “time required to complete the update” is the sum of the time required for installation and the time required for activation, while when the software installation has ended when the vehicle power source is in the on state (IG-ON), the “time required to complete the update” is only the time required for activation.

When the control unit 13 determines that a predetermined amount of time has elapsed since the vehicle power source was turned to the off state (IG-OFF) (YES in step S201), the processing advances to step S204. On the other hand, when the control unit 13 determines that the predetermined amount of time has not yet elapsed since the vehicle power source was turned to the off state (IG-OFF) (NO in step S201), the processing advances to step S202.

(Step S202) The accepting unit 12 of the vehicle control device 10 determines whether a forbidding request to forbid turning the vehicle power source to the on state (IG-ON) (hereinafter referred to as a “forbidding request to forbid turning the power source on") has been accepted from the electronic control unit 40. This forbidding request to forbid turning the power source on is a request to give priority to software updating over starting the vehicle system, and is sent from the electronic control unit 40 that has downloaded or installed software update data.

When the accepting unit 12 has received a forbidding request to forbid turning the power source on from at least one electronic control unit 40 (YES in step S202), the processing advances to step S203. On the other hand, when the accepting unit 12 has not accepted a forbidding request to forbid turning the power source on from any of the electronic control units 40 (NO in step S202), the processing advances to step S204.

(Step S203) The control unit 13 of the vehicle control device 10 forbids the power source of the vehicle from being turned to the on state (IG-ON) (forbids power source on). In other words, even though the user or the like performs input at the operating switch 20 to instruct the system to be started, the control unit 13 performs control to maintain the current off state (IG-OFF) without transitioning the vehicle power source to the on state (IG-ON). Also, the control unit 13 notifies the electronic control unit 40, which sent the forbidding request to forbid turning the power source on, that turning on the power source of the vehicle has been forbidden. This notification enables the electronic control unit 40 that has received the notification to carry out the software update to completion without having to worry about the processing being interrupted.

When the control unit 13 forbids the power source of the vehicle from being turned to the on state (IG-ON), the processing advances to step S201.

(Step S204) The control unit 13 of the vehicle control device 10 permits the power source of the vehicle to be turned to the on state (IG-ON) (permits power source on). When turning the power source on has been forbidden in the above step S203, the control unit 13 lifts the forbiddance on turning the power source on. That is to say, when the vehicle power source is currently in an off state (IG-OFF) and there is an input from the user or the like at the operating switch 20 to instruct the system to be started, the control unit 13 performs control to permit the vehicle power source to be transitioned from the off state (IG-OFF) to the on state (IG-ON).

Here, when the processing advances to this step S204 due to the forbidding request to forbid turning the power source on from the electronic control unit 40 being no longer present in the above step S202 (Case 1), turning the power source on of the vehicle is permitted based on determination that software updating of the electronic control unit 40 has been properly completed.

Figure 3:
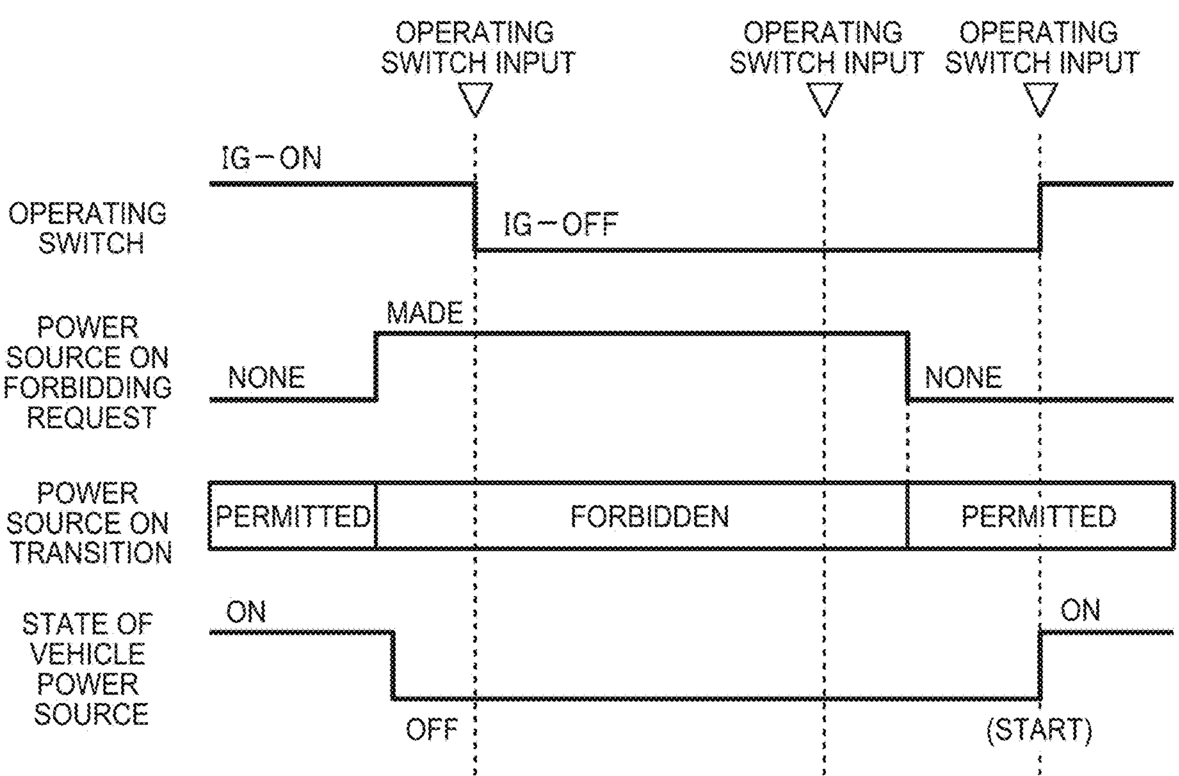
FIG. 3 is a timing chart of power source control executed by the vehicle control device (during normal processing)

An example of a timing chart of the power source control executed by the vehicle control device 10 in this Case 1 is shown in FIG. 3. As shown in FIG. 3, when the software update is performed correctly, turning the power source on is permitted during a period in which there is no forbidding request to forbid turning the power source on, and turning the power source on is forbidden during a period in which there is a forbidding request to forbid turning the power source on.

On the other hand, when the processing advances to this step S204 due to a predetermined amount of time having elapsed since the vehicle power source was turned to the off state (IG-OFF) in the above step S201 (Case 2), the power source of the vehicle is permitted to be turned on based on determination that some abnormality (including a failed software update) has occurred at the electronic control unit 40. In this case, the electronic control unit 40 at which the abnormality has occurred will continue to send a forbidding request to forbid turning the power source on, but in order to circumvent a situation in which the power source of the vehicle cannot be turned to the on state (IG-ON) indefinitely, the control unit 13 will discard this forbidding request to forbid turning the power source on, and permit the power source of the vehicle to be turned on.

Figure 4:
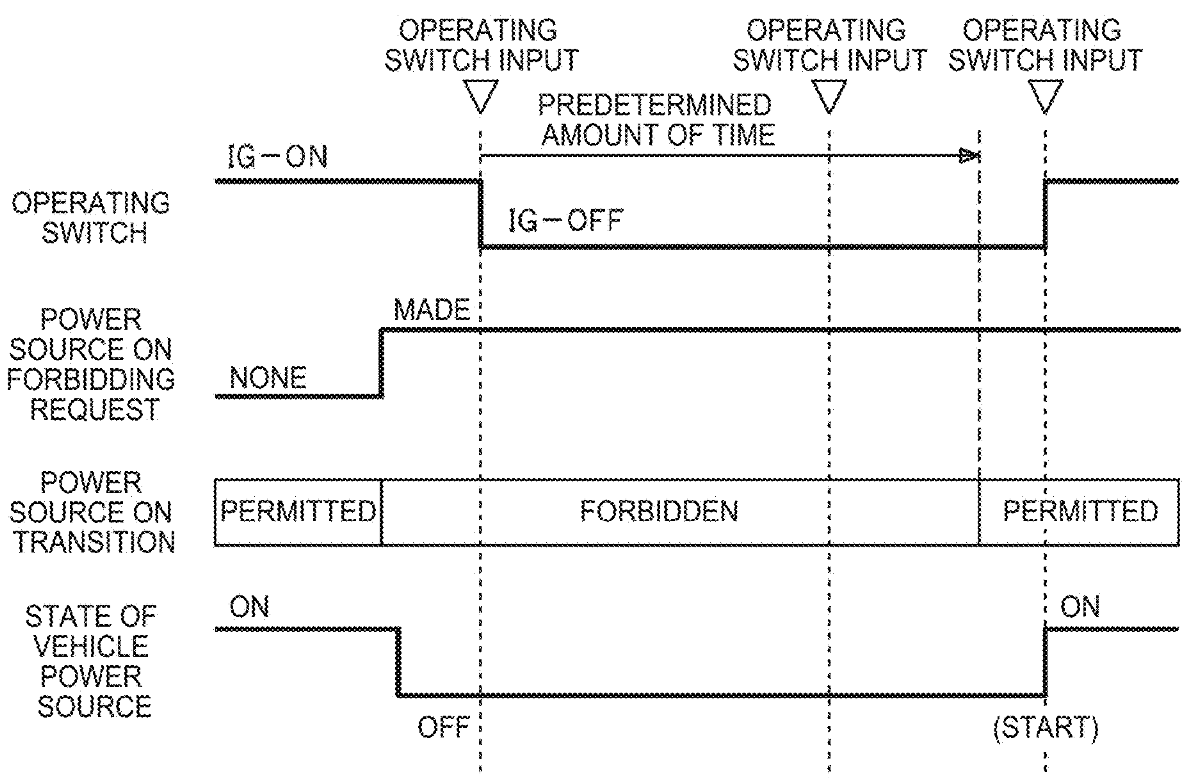
FIG. 4 is a timing chart of power source control executed by the vehicle control device (during timeout processing).

An example of a timing chart of the power source control executed by the vehicle control device 10 in this Case 2 is shown in FIG. 4. As shown in FIG. 4, when the forbidding request to forbid turning the power source on does not go away even after the predetermined amount of time has elapsed after the vehicle power source was turned to the off state (IG-OFF), due to an abnormality occurring such as a software update not being performed correctly, or the like, the forbiddance on turning the power source on is forcibly lifted and turning the power source on is permitted. Note that in this Case 2, occurrence of an abnormality in the electronic control unit 40 may be notified to the user by means of a display, sound, or the like.

When the control unit 13 permits the power source of the vehicle to be turned to the on state (IG-ON), the processing advances to step S205.

(Step S205) The acquisition unit 11 of the vehicle control device 10 determines whether an input operation has been performed at the operating switch 20 by the user or the like, for transitioning of the on/off state of the vehicle power source. When the acquisition unit 11 determines that an input operation has been performed at the operating switch 20 (YES in step S205), the processing advances to step S206.

(Step S206) The control unit 13 of the vehicle control device 10 controls (instructs) the vehicle power source unit 30 to transition the power source of the vehicle from the off state (IG-OFF) to the on state (IG-ON). Thus the system of the vehicle is started. When the power source of the vehicle is controlled to the on state (IG-ON), this power source control processing ends.

Operations and Effects

As described above, according to the vehicle control device 10 of one embodiment of the present disclosure, when there is a forbidding request to forbid turning the power source on from the electronic control unit 40 when the vehicle power source is in the off state (IG-OFF), control is performed such that transition of the vehicle power source from the off state (IG-OFF) to the on state (IG-ON), based on the input of the operating switch 20, is forbidden.

According to this control, even when the driver or the like who overlooks a message "Software updating in progress" displayed on a screen such as an information display or the like of the vehicle attempts to turn the power source of the vehicle to the on state (IG-ON) by performing an input operation at the operating switch 20, for example, the vehicle power source will not transition to the on state (IG-ON). This enables a situation in which system starting processing is initiated before the vehicle is in a fully prepared state to be circumvented, and also enables the ongoing software update processing to be completed in a sure manner.

Also, according to the vehicle control device 10 of the present embodiment, when the vehicle power source is in an off state (IG-OFF) and there also is a forbidding request to forbid turning the power source on, turning the power source on is forbidden, while when a predetermined amount of time has elapsed since the vehicle power source was turned to the off state (IG-OFF), the forbiddance on turning the power source on is forcibly lifted and control is performed to permit the power source of the vehicle to be turned on (IG-ON) regardless of whether a forbidding request for turning the power source on has been made.

According to this control, even in a situation in which a forbidding request to forbid turning the power source on continues to be sent to the vehicle control device 10 due to, for example, software updating processing not proceeding correctly or the like in the electronic control unit 40, the power source of the vehicle can be turned to the on state (IG-ON) after a predetermined amount of time has elapsed. This enables situation in which the power source of the vehicle cannot be turned to the on state (IG-ON) indefinitely to be circumvented.

While one embodiment of the present disclosure has been described above, present disclosure is not limited to just the vehicle control device described above, and can be understood as being also a method executed by a vehicle control device having a processor and a memory, a program for the method, a computer-readable non-transitory recording medium storing the program, a vehicle equipped with the vehicle control device, and so forth.

The vehicle control device according to the present disclosure can be used in a vehicle or the like equipped with an electronic control unit capable of performing software updating processing.

What is claimed is:

1. A vehicle control device that is configured to control a vehicle power source, the vehicle control device comprising a processor configured to:

acquire input information of an operating switch configured to transition on and off states of the vehicle power source;

accept a forbidding request from one or more electronic control units installed in the vehicle, the forbidding request being a request to forbid the vehicle power source from being turned to an on state and being continuously transmitted from the one or more electronic control units while transition of the vehicle power source to the on state is prohibited;

control the on and off states of the vehicle power source; and when the forbidding request is made in an off state of the vehicle power source, forbid the vehicle power source from being turned to the on state in response to an operation input to the operating switch.

2. The vehicle control device according to claim 1, wherein the processor is configured to permit the vehicle power source to be turned to the on state in response to operation input to the operating switch when a predetermined amount of time elapsed since the vehicle power source turned to the off state.

3. The vehicle control device according to claim 2, wherein the processor is configured to accept the forbidding request from a particular electronic control unit that is an object of a software update, among the one or more electronic control units.

4. The vehicle control device according to claim 3, wherein the processor is configured to, when the processor forbids the vehicle power source from being turned to the on state, notify the particular electronic control unit that the processor forbids the vehicle power source from being turned to the on state.

5. The vehicle control device according to claim 3, wherein the predetermined amount of time is set to be no less than an amount of time required to complete the software update at the particular electronic control unit.

6. A vehicle control method for controlling a vehicle power source, the vehicle control method comprising:

acquiring input information of an operating switch configured to transition on and off states of the vehicle power source;

accepting a forbidding request from one or more electronic control units installed in a vehicle, the forbidding request being a request to forbid the vehicle power source from being turned to an on state and being continuously transmitted from the one or more electronic control units while transition of the vehicle power source to the on state is prohibited; and when the forbidding request is made in an off state of the vehicle power source, forbidding the vehicle power source from being turned to the on state in response to an operation input to the operating switch.

7. A non-transitory storage medium storing instructions that are executable by one or more processors and that cause the one or more processors to perform functions comprising:

acquiring input information of an operating switch configured to transition on and off states of a vehicle power source;

accepting a forbidding request from one or more electronic control units installed in a vehicle, the forbidding request being a request to forbid the vehicle power source from being turned to an on state and being continuously transmitted from the one or more electronic control units while transition of the vehicle power source to the on state is prohibited; and when the forbidding request is made in an off state of the vehicle power source, forbidding the vehicle power source from being turned to the on state in response to an operation input to the operating switch.

* * * * *